Figure 1:
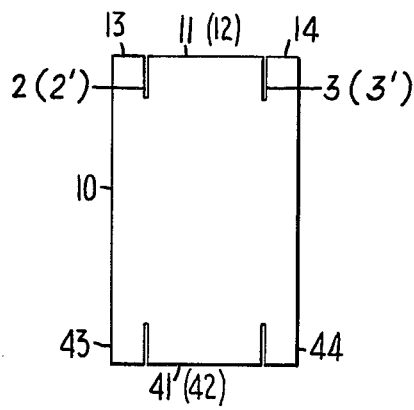

INVENTORS
HOWARD E. KASTING &
JOHN P. SACHS
BY
*John F. Hohmann*
ATTORNEY

United States Patent Office 3,220,635
Patented Nov. 30, 1965

3,220,635
THERMOPLASTIC BAG
Howard E. Kasting, Park Forest, Ill., and John P. Sachs, Stamford, Conn., assignors to Union Carbide Corporation, a corporation of New York
Filed Nov. 9, 1962, Ser. No. 236,495
14 Claims. (Cl. 229—57)

This invention relates to bags and bag closures, including both valved and unvalved closures, made of heat-sealable thermoplastic film.

The joining of thermoplastic film, required to make a bag, is best done by heat-sealing, in which the film portions to be joined are pressed together between two surfaces, one heated and the other usually unheated. A heat-sealed lapjoint, which takes stresses in shear through the joint, can be made about as strong as the film itself; but a heat-sealed face-to-face or "pinch" joint, which must resist stresses tending to peel apart the films is usually considerably weaker than the film. Strong heat seals are of particular importance in industrial bags made of heavy gage thermoplastic film.

In one embodiment, the present invention is concerned with the produtcion of rugged sift-proof bags from tubular thermoplastic film, said bags having flat rectangular shaped bottom end closures formed by sealed overlapping layers of film and made in such manner that stress is transmitted to said seals by the bag's contents or applied in shear, whereby the overlapped areas are substantially as resistant to rupture as the film in the bag walls.

In another embodiment this invention contemplates providing such bags with flat rectangular shaped top closures having tubular filling valves formed of thermoplastic film and integral with the top closure, the closing of said valve being effected by the bag's contents pressing together the valve's opposite walls into a sift-proof contact with each other.

In another embodiment, this invention provides a bag of heat-sealable thermoplastic film having a satchel bottom and a valved satchel top, all of the heat-sealed joints included in the bag being lap joints.

Figure 2:
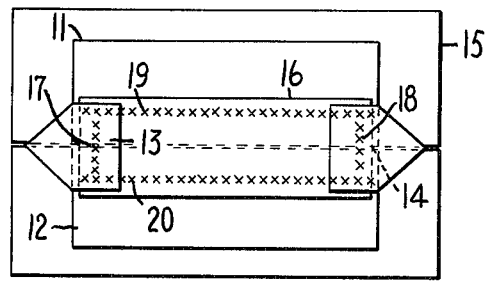
Figure 3:
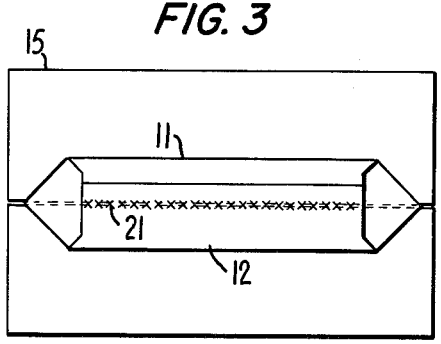
Figure 4:
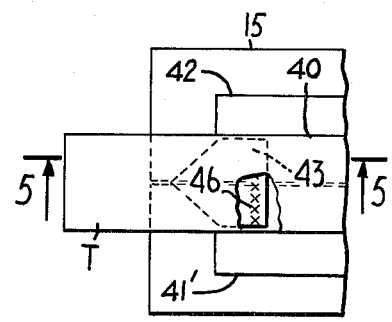
Figure 5:
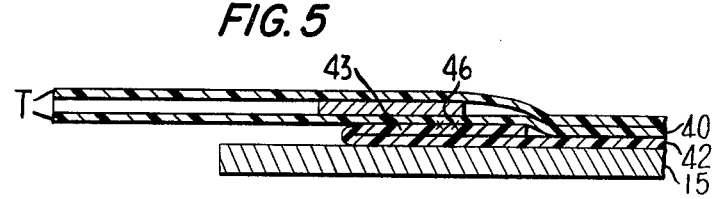

In the drawings:

FIG. 1 is a front elevation of a bag blank comprising a flattened tube 10 having side flaps 11 and 12 and end tabs 13 and 14 formed in one end of the tube 10, and side flaps 41 and 42 and end tabs 43 and 44 formed in the other end of the tube 10;

FIG. 2 is a top view of the bag blank of FIG. 1, supported on a split platen 15, showing the side flaps 11 and 12 outfolded, the end tabs 13 and 14 infolded, and a membrane film 16 sealed to the end tabs 13 and 14 by heat-seals 17 and 18, and sealed to the side walls of the blank adjacent to the flaps 11 and 12 and to the tabs 13 and 14 by other heat-seals 19 and 20;

FIG. 3 is a top view of the bag blank of FIG. 2, showing the side flaps 11 and 12 infolded, overlapped and heat-sealed to each other by a seal 21;

FIG. 4 is a bottom view of the bag blank of FIG. 1, showing a membrane film 40 of a form alternate to the membrane film 16 of FIG. 2, the membrane film 40 of FIG. 4 providing a valve tube; and FIG. 5 is an enlarged section through 5—5 of FIG. 4.

The terms "side" and "end" as used herein in referring to the bag walls, flaps, tabs, and membranes correspond to the sides and ends of the rectangle formed by the cross-section of the bag when viewed from an end.

In accordance with the present invention, there is provided a satchel bottom bag of heat-sealable thermoplastic film having at least at one end a rectangular closure structure comprising a pair of opposed infolded end portions and a thermoplastic film membrane bridging the gap between and overlapping at least the ends of the infolded end portions, the side edges of the membrane being joined by heat-seals to the side walls of the bag, and at least one end of the membrane being joined by a heat-seal to the end portion which it overlaps.

A preferred embodiment of the invention will be described in more detail by referring to the drawings.

The bag blank shown in FIG. 1 comprises a flattened tube 10 of thermoplastic film having at its upper end four slits 2, 2' and 3, 3' extending longitudinally inward from the end of the tube so as to form a pair of opposed similar side flaps 11, 12 and a pair of opposed similar end tabs 13, 14. In the particular embodiment illustrated, the side flaps 11, 12 and end tabs 13, 14 have square ends and substantially parallel sides, and the width of the side flaps is about equal to the width of the side walls of the bag to be formed.

As shown in FIG. 2, the end tabs 13, 14 are first infolded, and a thermoplastic film membrane 16 is inserted under (or over) the infolded end tabs. The membrane 16 is long enough to bridge the gap between, and overlap at least the ends of, the infolded end tabs. The membrane 16 is also preferably at least as wide as the end tabs. The side edges of the membrane 16 are joined by heat-seals 19 and 20 to the side walls of the bag in the areas adjacent to the side flaps 11 and 12, and the ends of the membrane 16 are joined by heat-seals 17 and 18 to the end tabs 13 and 14, thus forming a liquid tight and sift-proof closure. The heat-seals 19 and 20 also join the side edges of the end tabs 13 and 14 to the membrane 16 and the side walls thereunder.

Referring now to FIG. 3, the side flaps 11 and 12 are then infolded along with the side edges of the infolded end tabs 13 and 14, the side edges of the membrane 16, and those portions of the side walls of the bag to which the end tabs and membrane are sealed. In other words, the side flaps are infolded along lines extending along the inner edges of the heat seals 19 ad 20. The side flaps 11 and 12 overlap each other when they are infolded and are joined to each other in the overlap by a heat-seal 21, providing additional strength to the bag closure and also providing a convenient handhold.

Referring to FIGS. 4 and 5, a valve may be formed in the end closure by providing a membrane 40 having a tubular portion T, of which the flattened wall facing the end tab 43 is joined to that tab 43 by a heat-seal 46, and the other flattened wall is unattached, so that there is an opening through the tubular portion T into the bag.

As can be seen in FIG. 2, the bag end is actually completely closed by the heat seals 17, 18, 19, and 20, before the side flaps 11 and 12 are infolded. Thus, although it is preferred to have side flaps which can be infolded and overlapped to provide additional strength and a convenient hand-hold, the side flaps are not critical and can even be eliminated. Alternatively, the side flaps may be made just large enough to fold over the heat-seals 19 and 20. In such a case, the side flaps are heat-sealed to the membrane 16 and end tabs 13 and 14 rather than to each other. In any case where the infolded side flaps are to be sealed to the membrane 16 and end tabs 13 and 14, the heat seals 19 and 20 may be made using a single heat-seal to simultaneously seal each side flap to the membrane and the membrane to the side wall.

As shown in FIG. 3, it is preferred to infold the portions of the side walls containing the heat seals 19 and 20 along with the side flaps (if any) so that any forces transmitted to said seals tend to be in shear rather than in peel. However, since this is not essential for many uses, it is possible to infold only the side flaps, i.e., along lines extending along the side edges of the end tabs. Similarly, infolding of those portions of the side walls containing the heat seals 19 and 29 may also be eliminated where no side flaps are used.

Referring back to FIG. 2, the closure structure shown therein can be used to provide a convenient filling opening for the bag if only one or none of the heat seals 19 and 20 is made. For example, if only the heat seal 20 is made, a filling opening is provided between the membrane 16 on the top and the side flap 11 and adjacent side wall on the bottom. After the bag has been filled, the heat seal 19 is made, and the side flaps 11 and 12 are infolded, overlapped, and sealed together as described above. In the case of non-overlapping side flaps, one side flap is initially infolded and sealed through the membrane to the side wall. After the bag is filled, the other side flap is infolded and sealed in the same manner. In the case of a bag with no side flaps, one side of the membrane is sealed to the underlying side wall before filling, and the other side is sealed after filling. In any of these cases, it is preferred to infold the portions of the side walls containing the heat seals so that any forces transmitted to said seals tend to be in shear rather than in peel. The same effect may be obtained by folding a strip of thermoplastic film over the filling opening to form a U-shaped sealing member coextensive with the opening, one side of the U being heat-sealed to the membrane and the other side to the side wall. Alternatively, the filling opening may be sealed by tape, sewing, and adhesive, or any other suitable sealing means.

As a typical example of the invention, four three-inch long vertical slits 2, 2' and 3, 3' were made in each end of a square-end cut thirty-two inch long polyethylene flattened tube 10 of twenty-one inch flat width and 10 mil (0.010 inch) wall thickness (FIG. 1). These slits formed at the top end a pair of opposed similar side flaps 11 and 12 measuring three inches by fourteen and one-quarter inches, and a pair of end tabs 13 and 14 measuring three inches by six and three-quarter inches, and at the bottom end similar side flaps 41 and 42 and similar end tabs 43 and 44.

All heat-seals made in this tube material in subsequent operations were made by using a sealing-bar temperature in the range of 750° F. for a time of about 0.8 second. A suitable heat-sealing device is described in a copending United States patent application bearing Serial No. 198,014, filed May 28, 1962, and entitled "Plastic Film Welding Process and Apparatus."

The slit tube was positioned between and grasped by the two halves of a split platen 15 (FIG. 2) along a fold line such that six and three-eighth inches of the top end of the tube extended above the platen. The two side flaps 11 and 12 were outfolded in opposite directions onto the platen, and the two end tabs 13 and 14 were infolded onto the side walls, the portions of the tube above the platen and below the end tabs being folded in a "diamond" fold with the angles at the folded edges of the tube being about 90°.

A strip of polyethylene film, a little wider than the end tabs 13 and 14 and long enough to bridge the gap between, and to overlap at least the ends of, the infolded end tabs 13 and 14, was applied as a membrane 16 either above or below the end tabs. A thin metal conventional heat-seal back-up plate was inserted between the membrane 16 and the outfolded side wall and side flaps 11 and 12, and heat-seals 17 and 18 were made between the membrane 16 and the end tabs 13 and 14 in the conventional manner of applying pressure with a heated bar. The back-up plate was withdrawn and heat seals 19 and 20 were made, using the platen 15 as a back-up plate, joining the sides of the end tabs and the sides of the membrane to each other and to the side walls of the tube along a line three and one-quarter inches from the end of the tube 10.

The side flaps 11 and 12 were then infolded and overlapped (FIG. 3) by one and one-half inches. A thin metal backup plate five and five-eighths inches wide was placed just under the overlapped flaps, and a heat seal 21 was made, joining the flaps. The bag was then removed from the platen. The result was a liquid-tight, strong, satchel-bottom closure substantially perpendicular to the bag walls.

After the bottom closure had been formed in the afore-described bag, it was then upended and the open end placed in the platen 15 as before with six and three-eighth inches of the open end of the tube protruding above the platen (FIG. 4). The steps of making the closure were identical with those described with reference to FIGS. 1 to 3, except for the attachment of one end of the membrane 40 to an end tab 43, i.e., the membrane end having tubular portion T.

The tubular portion T was in some examples integral with or attached to the membrane 40, in which case the heat-seal 46 between the end tab 43 and only the adjacent wall of the tubular portion T (FIGS. 4 and 5) was made between a heat-seal bar under the end tab 43 and a thin metal back-up plate inserted in the tubular portion T. In other examples, before the membrane 40 was applied, a separate strip, to become the lower wall of the tubular portion, was heat-sealed to the end tab 43 between a heat-seal bar above the tab 13 and strip and a back-up plate beneath the tab 43; the membrane 40 was made long enough to provide the material for the upper wall of the tubular portion, and the tubular portion was formed by heat-sealing the edges of the strip to the edges of the membrane, the final appearance being the same as shown in FIGS. 4 and 5.

This completed a valved bag having a satchel bottom and top.

It will be apparent that without substantial change, the invention may be applied to other heat-sealable thermoplastic resin film, both clear and filled, colored or pigmented, of various thicknesses, and to produce sacks and bags of various sizes and either open end or closed, with or without valves, single walled or multi-walled, and using either seamless or seamed tubing.

In none of the heat-sealing operations described herein, is it necessary to insert either the heating bar or the back-up bar within the bag, i.e. all operations are conducted above the split platen 15. Thus, the invention is well adapted for automatic machine manufacture of bags from thermoplastic resin film.

While various specific forms of the present invention have been illustrated and described herein in some detail, it will be apparent that the same are susceptible of numerous modifications. For example, the size and shape of the infolded end portions provided by the invention are not critical so long as they provide surfaces to which the ends of the membrane may be sealed. Also, while the invention has been described with particular reference to a membrane film that is originally separate from the bag blank, the membrane may be integral with the bag blank, such as a long side flap which can be infolded across the end tabs and heat-sealed to the opposing side flap or side wall and to the end tabs in the same manner as a separate membrane.

What is claimed is:

1. A satchel bottom bag of heat-sealable thermo-plastic film having at least, at one end, a rectangular closure structure comprising a pair of opposed infolded end portions and a separate thermoplastic film membrane bridging the gap between and overlapping at least the ends of said infolded end portions such that at least one end of said membrane is heat sealed directly to the end portion which it overlaps by a continuous heat-seal, the side edges of said membrane overlapping and being directly heat sealed on the side walls of said bag by a continuous heat-seal in their common area of overlap, and at least one heat seal in said closure being a load bearing shear seal.

2. The bag of claim 1 wherein at least one end of said membrane is provided with a tubular portion of which only the wall adjacent an end tab is heat-sealed to such, providing a valve for the bag closure.

3. The bag of claim 1 wherein each end of said membrane is directly sealed by continuous heat-seals to the end portion which it overlaps.

4. A satchel-bottom bag of heat-sealable thermoplastic film having at least at one end a rectangular closure structure comprising a pair of opposed infolded end tabs and a separate thermoplastic film membrane bridging the gap between and overlapping at least the ends of said infolded end tabs, said membrane being at least as wide as said end tabs, the side edges of said membrane and the side edges of said end tabs sealed directly to each other and to the side walls of said bag, in their common areas of overlap by continuous heat-seals, at least one end of said membrane sealed by a continuous heat-seal to the end tab which it overlaps and at least one heat seal in said closure being a load bearing shear seal.

5. A satchel-bottom bag of heat-sealable thermoplastic film having at least at one end a rectangular closure structure comprising a pair of opposed infolded end tabs and a pair of opposed infolded overlapping side flaps; and a separate thermoplastic film membrane bridging the gap between and overlapping at least the ends of said infolded end tabs, the side edges of said membrane sealed directly to the side walls of said bag in their common area of overlap by continuous heat-seals, at least one end of said membrane sealed by a continuous heat-seal to the end tab which it overlaps, and said side flaps sealed by a continuous heat-seal only directly to each other in the overlap and at least one heat seal in said closure being a load bearing shear seal.

6. The bag of claim 5 wherein the side edges of said infolded end tabs are sealed by continuous heat-seals directly to the side walls of said bag.

7. A satchel-bottom bag of heat-sealable thermoplastic film having at least at one end a rectangular closure structure comprising a pair of opposed infolded end portions and a pair of opposed infolded side flaps; and a separate thermoplastic film membrane bridging the gap between and overlapping at least the ends of said infolded end portions and side flaps, the side edges of said membrane sealed by continuous heat-seals directly to said infolded side flaps in their common area of overlap, and at least one end of said membrane directly sealed by a continuous heat-seal to the end portion which it overlaps and at least one heat seal in said closure being a load bearing shear seal.

8. The bag of claim 7 wherein the heat-seals which seal the side edges of said membrane directly to said side flaps also seal said membrane and side flaps directly to the side walls of said bag.

9. A satchel-bottom bag of heat-sealable thermoplastic film having at least at one end a rectangular closure structure comprising a pair of opposed infolded end portions and a separate thermoplastic film membrane bridging the gap between and overlapping at least the ends of said infolded end portions, the ends of said membrane sealed by continuous heat-seals directly to said infolded end portions, and one side edge of said membrane sealed by a continuous heat-seal directly to the adjacent side wall of said bag, the other side edges of said membrane forming a filling opening with the adjacent side wall of said bag such that when the bag is filled and said other side edge of said membrane is adhered to said adjacent side wall of said bag to completely close said filling opening, sifting of contents between the overlapping portions of said closure in said bag is prevented by the direct heat-seals between said side wall and said membrane sheet and the direct heat-seals between said infolded end portions and said membrane, and at least one heat-seal in said closure being a load bearing shear seal.

10. A satchel-bottom bag of heat-sealable thermoplastic film having at least at one end a rectangular closure structure comprising a pair of opposed infolded end portions and a pair of opposed side flaps; and a separate thermoplastic film membrane bridging the gap between and overlapping at least the ends of said infolded end portions, the ends of said membrane sealed by continuous heat-seals directly to said infolded end portions, one of said side flaps being infolded and sealed by a continuous heat-seal directly to one side edge of said membrane, the other side edge of said membrane forming a filling opening with the adjacent side flap and side wall of said bag such that when the bag is filled and the other side flap is infolded and adhered to the other side edge of said membrane to completely close said filling opening, sifting of contents between the overlapping portions of said closure in said bag is prevented by the direct heat-seals between said side flap and said membrane sheet and the direct heat-seals between said infolded end portions and said membrane sheet, and at least one heat-seal in said closure being a load bearing shear seal.

11. The bag of claim 10 wherein the heat-seal which seals said infolded side flap directly to the side edge of said membrane also seals said membrane and said infolded side flap directly to the side wall of said bag.

12. A satchel-bottom bag of heat-sealable thermoplastic film having at least at one end a rectangular closure structure comprising a pair of side flaps, a pair of opposed infolded end portions and a separate thermoplastic film membrane bridging a gap between and overlapping at least the ends of said infolded end portions, at least one end of said membrane sealed by a continuous heat-seal directly to the end portion which it overlaps such that the end edge of said membrane is coextensive with the end edges of the adjacent side flaps, thereby forming a composite member with said side flaps, the said edges of said composite member sealed by a pair of continuous heat-seals directly to the side walls of said bag, said pair of heat-seals being coextensive with said side flaps, and at least one heat seal in said closure being a load bearing shear seal.

13. The bag of claim 12 wherein each end of said membrane is directly sealed by heat-seals continuous to the end portion which it overlaps.

14. A satchel bottom bag of heat-sealable thermoplastic film having at least, at one end, a rectangular closure structure comprising a pair of opposed infolded end portions and a separate thermoplastic film membrane bridging the gap between and overlapping at least the ends of said infolded end portions such that one end of said membrane being provided with a tubular portion of which only the wall adjacent the end tab is heat-sealed to such, providing a valve for the bag closure, the side edges of said membrane overlapping and being directly heat-sealed on the side walls of said bag by a continuous heat-seal in their common area of overlap, and at least one heat seal in said closure being a load bearing shear seal.

References Cited by the Examiner
UNITED STATES PATENTS

| | | | |
|---|---|---|---|
| 1,716,818 | 6/1929 | Hammond | 229—59 |
| 3,004,698 | 10/1961 | Ashton | 229—62.5 |
| 3,117,711 | 1/1964 | Camerini | 229—57 |

FOREIGN PATENTS

| | | |
|---|---|---|
| 969,586 | 6/1958 | Germany. |
| 745,327 | 2/1956 | Great Britain. |

FRANKLIN T. GARRETT, *Primary Examiner.*